United States Patent
Hsieh

(10) Patent No.: US 6,798,449 B2
(45) Date of Patent: Sep. 28, 2004

(54) AUTOMATIC WHITE-BALANCE CORRECTION FOR DIGITAL CAMERA

(75) Inventor: Wen-Chieh Hsieh, Taipei Hsien (TW)

(73) Assignee: Kinpo Electronics, Inc., Taipei (TW)

( * ) Notice: Subject to any disclaimer, the term of this patent is extended or adjusted under 35 U.S.C. 154(b) by 814 days.

(21) Appl. No.: 09/761,682

(22) Filed: Jan. 18, 2001

(65) Prior Publication Data

US 2002/0122120 A1 Sep. 5, 2002

(51) Int. Cl.[7] .............................................. H04N 9/73
(52) U.S. Cl. ................................................ 348/223.1
(58) Field of Search ........................ 348/223.1, 225.1; 358/515, 516, 518; 382/162, 164, 167

(56) References Cited

U.S. PATENT DOCUMENTS

| | | | | |
|---|---|---|---|---|
| 4,736,241 A | * | 4/1988 | Murakami et al. | 348/225.1 |
| 5,274,440 A | * | 12/1993 | Miyazaki | 348/655 |
| 5,555,022 A | * | 9/1996 | Haruki et al. | 348/223.1 |
| 6,040,855 A | * | 3/2000 | Gamou | 348/223.1 |
| 6,477,271 B1 | * | 11/2002 | Cooper et al. | 382/167 |
| 6,642,957 B1 | * | 11/2003 | Taura | 348/223.1 |
| 6,670,987 B1 | * | 12/2003 | Taura | 348/223.1 |

FOREIGN PATENT DOCUMENTS

| | | | | |
|---|---|---|---|---|
| JP | 57-197987 | * | 12/1982 | H04N/9/535 |
| JP | 2000-32492 | * | 1/2000 | H04N/9/73 |

* cited by examiner

*Primary Examiner*—Andrew Christensen
*Assistant Examiner*—Heather R. Long
(74) *Attorney, Agent, or Firm*—Bacon & Thomas PLLC

(57) ABSTRACT

There is disclosed an automatic white-balance correction method for digital camera, which divides a captured picture into multiple sampled regions for performing a white-balance correction. The image data of the captured picture is transformed form RGB format to YCrCb format. Then, the mean values of Y, Cr, and Cb are calculated for each sampled region based on the multiple sampled regions. Finally, Cr and Cb are used as two coordinate axes to define four quadrants, and the values of Cr and Cb of each sampled region are used to determine a corresponding quadrant for each sampled region, thereby determining a correction direction based on the number of sampled regions in each quadrant.

12 Claims, 3 Drawing Sheets

AUTOMATIC WHITE-BALANCE CORRECTION FOR DIGITAL CAMERA

BACKGROUND OF THE INVENTION

1. Field of the Invention

The present invention relates to the field of image color adjustment and, more particularly, to an automatic white-balance correction method for digital camera, digital video camera, or PC camera.

2. Description of Related Art

Currently, the automatic white-balance correction method is in wide spread use in the digital camera, digital video camera or a PC camera. However, the variation of natural light due to different time or weather condition and the effect of artificial illumination may cause errors in color tones as taking pictures by a camera or video camera. For example, the picture will show yellow color when the color temperature of light source is low, and blue color when the color temperature of light source is high. Therefore, the high color temperature (8500K) of light source from the fluorescent lamps commonly used in our everyday life will make the color of picture to be of blue color. Moreover, the specific wavelength of the fluorescent lamps may also make the color of picture to be of green color. As such, there is a need to perform an adjustment such that the color of the captured object is not affected by the circumstance. Such an adjustment is performed by white-balance correction, which allows the captured picture to be white-balanced in color. That is, the color of a white object is always shown to be white under any light sources.

The white-balance correction of the conventional analog camera is performed by integrating the red and blue chromatic signals (R-Y and B-Y) respectively, so as to control the gains of the red and blue signal, thereby the integral value being approached to the white-balance point. Therefore, the aforementioned white-balance correction is easily disturbed by the color of the object to be captured, and the color of the captured image will deviate from the origin color of the picture. In the advanced digital camera, the red and blue signals of objects taken by the photo-sensors are used to control the gains of red and blue signals for performing the white-balance correction. However, due to the limitation of visual angle of sensitivity of the photo-sensors, the performance of such a white-balance correction is not satisfactory.

Another white-balance correction method for digital camera is performed by analyzing the image to determine the luminance (Y), blue chrominance (Cb) and red chrominance (Cr) for the pixels of each region in the picture, so as to alleviate the color deviation in different color temperatures. However, such a white-balance correction method only considers the general variation of color temperature rather than artificial illumination, for example, the fluorescent lamps, and thus it can not work well for white-balance correction under fluorescent lamps. Furthermore, such a conventional method judges the color temperature according to the variation degree of the neighboring regions and the concentration of color. It results in less color loss for the object having a huge color block and a high color concentration. However, the probability of having a huge color block in a general environment is quit low and the CCD camera usually has different sensing features in the center and the peripheral portions. The huge color blocks with the same color exist very seldom in general environment. The judgement of color concentration may result in having no correction for the color block with a high color concentration, which may be caused by color temperature. Therefore, this adjustment can be applied to a specific condition, but is not suitable in general environment to achieve the white-balance correction. Therefore, there is a need to have a novel white-balance correction method to mitigate and/or obviate the aforementioned problems.

SUMMARY OF THE INVENTION

The object of the present invention is to provide an automatic white-balance correction method for digital camera, which utilizes the variation curve of color temperature as a reference for performing an adjustment, so as to avoid abnormal correction result, and avoid being influenced by small color block.

With this object in view, the automatic white-balance correction method for digital camera in accordance with the present invention divides a captured picture into multiple sampled regions for performing a white-balance correction. The method includes the steps of: (A) transforming image data of the captured picture form RGB format to YCrCb format; (B) calculating mean values of Y, Cr, and Cb for each sampled region based on the multiple sampled regions; and (C) using Cr and Cb as two coordinate axes to define four quadrants, and using the values of Cr and Cb of each sampled region to determine a corresponding quadrant for each sampled region, thereby determining a correction direction based on the number of sampled regions in each quadrant.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
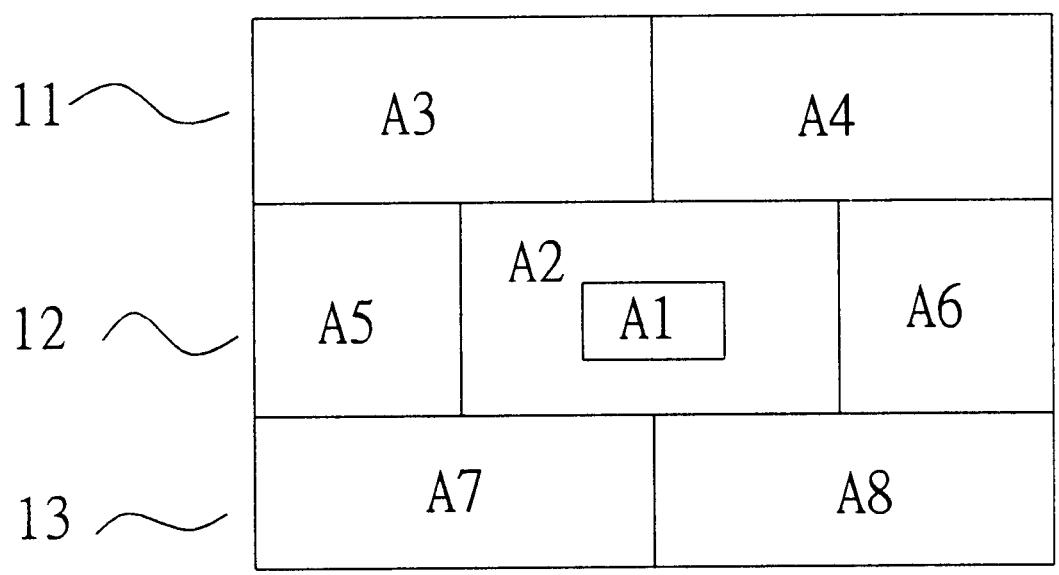
FIG. 1 schematically illustrates multiple sampled regions of the captured picture in accordance with the automatic white-balance correction method of the present invention.

Referring now to FIG. 1, there is illustrated an automatic white-balance correction method for digital camera in accordance with a preferred embodiment of the present invention, wherein the taken picture is divided, based on the trisection sampling theorem, into an upper region 11 (sky), a middle region 12 (subject), and a lower region 13 (ground). Due to the fact that a large upper or lower region may result in a difficulty to determine the left-right relation as the features are disappeared after being averaged, each of the upper and lower regions is further equally divided into two region, thereby producing the regions A3, A4, A7, and A8 as shown in the figure. Based on the same reason, the middle region 12 is also divided in such a manner that two regions are located at left and right sides, respectively, and a subject region is preset in the center region, thereby defining four regions A1, A2, A5, and A6 as shown in the figure. As such, the overall sampled picture is divided into eight regions A1~A8.

Figure 2:
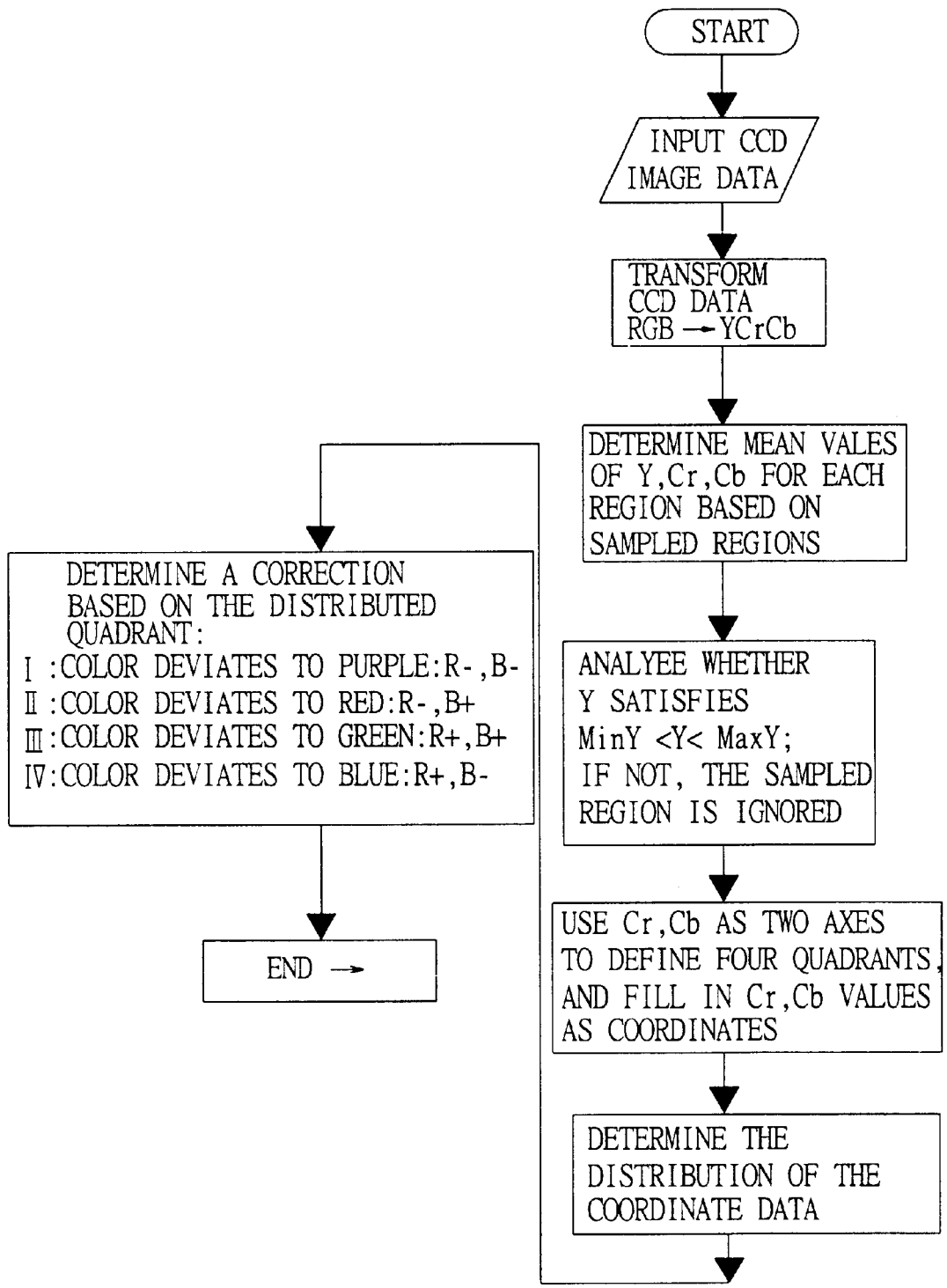
FIG. 2 is the flowchart of the automatic white-balance correction method of the present invention.

FIG. 2 is a flowchart of the automatic white-balance correction method for adjusting the CCD image data captured by the digital camera, which first transforms the CCD image data from RGB format to YCrCb format according to the following equation:

$$\begin{bmatrix} Y'_{601} \\ C_B \\ C_R \end{bmatrix} = \begin{bmatrix} 16 \\ 128 \\ 128 \end{bmatrix} + \frac{1}{256} \begin{bmatrix} 65.738 & 129.057 & 25.064 \\ -37.945 & -74.494 & 112.439 \\ 112.439 & -94.154 & -18.285 \end{bmatrix} \cdot \begin{bmatrix} R'_{255} \\ G'_{255} \\ B'_{255} \end{bmatrix}$$

and the transformed data are calculated based on the aforementioned A1~A8 regions to determine the mean values of Y, Cr and Cb of each region.

If the transformed image data of each sampled region is too bright or too dark, the color will be suppressed and its value is not required for the white-balance correction. Therefore, such transformed data can be filtered out. That is, by evaluating the value of Y for each sampled region, it is determined whether the condition of Min Y<Y<Max Y is satisfied, where Y is in the range of 0~255, and Min Y and Max Y are preferred to be 64 and 180, respectively. If the value of Y is not satisfied the aforementioned condition, the corresponding sampled region is too dark or too bright, and thus is not required for white-balance correction.

Figure 3:
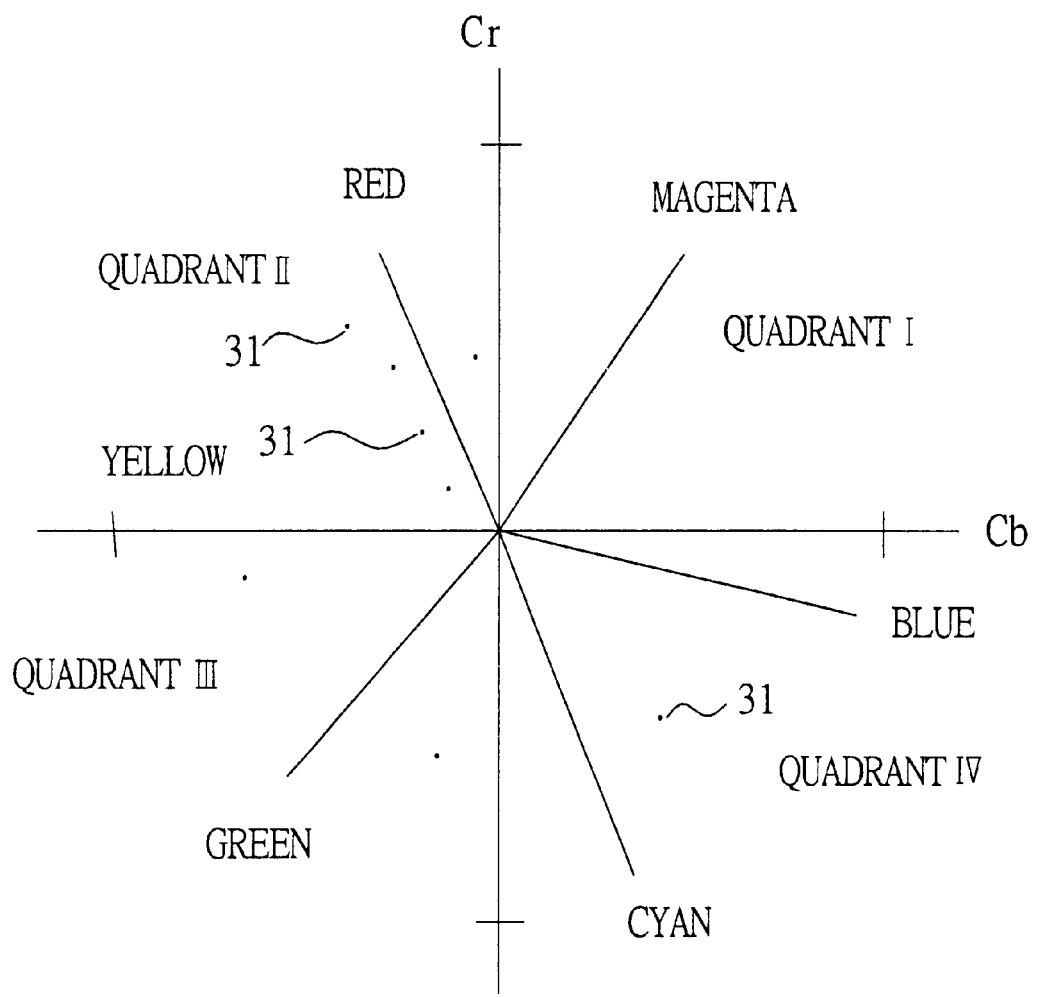
FIG. 3 is a color distribution diagram established by the automatic white-balance correction method in accordance with the present invention.

After filtering, the effective image data of the sampled regions are obtained for adjusting the ratio of colors to achieve the white-balance. The adjustment process is based on that fact that the color is changed from red to blue when the color temperature is changed from low to high. Thus, the correction is focused on the gains of the red and blue colors. Although the green color is also varied with the change of color temperature, its influence is not so obvious and can be compensated by the red and blue colors. Consequently, only the red and blue colors are used in the actual color adjustment process. With reference to FIG. 3, there is shown a color distribution diagram, wherein the Cr and Cb are used as two coordinate axes to divide the color relation into four quadrants, and the values of Cr and Cb of each sampled region are used as coordinate values 31 for being filled into the diagram, so as to determine the corresponding quadrant for a sampled region, thereby obtaining the color feature of each sampled region.

From the distribution of each sampled region shown in FIG. 3, it is able to determine the occupied ratio of each quadrant by statistics, so as to decide whether the whole picture is deviated in color or only a part of the picture is deviated in color. If only a part of the picture is deviated in color, it is possible that such a color deviation is caused by capturing a color block, instead of the change of color temperature, and thus there is no need to perform any color adjustment. When most of the picture is deviated in color, the color deviation direction can be determined by inspecting the number of sampled regions in each quadrant, so as to perform a color correction in an opposite direction.

In general, the sampled regions are mostly distributed in quadrant II or IV; that is, the color is deviated to red and blue color. Under such a condition, it is simply to adjust the ratio of Cr and CB to be 1:1, wherein, when color is deviated to red, the red gain is decreased and the blue gain is increased, and when color is deviated to blue, the blue gain is decreased and the red gain is increased. If most of the picture is distributed in quadrant III, it indicates that the picture may be taken under the light of fluorescent lamp and the color is deviated to green. Under this condition, there are two methods applicable for correction. One is to adjust the gain of green color, which results in the adjustment of all three RGB colors, so that it becomes difficult in distinguishing the color, and the distortion is increased. The other preferable one is to adjust and increase the gains of red and blue colors simultaneously to achieve the same effect. Similarly, if most of the picture is distributed in quadrant I, the gains of read and blue colors are decreased simultaneously to compensate the deviation.

In view of the foregoing, the automatic white-balance correction method in accordance with the present invention is able to utilize the variation curve of color temperature as a reference for performing an adjustment, so as to avoid abnormal correction result. Furthermore, the present invention is able to determine whether the color deviation is caused by the light source or a single color block, so as not to be influenced by a small color block. Because the illumination of a light source is comprehensive and it is impossible to have only one or two regions being influenced, the aforementioned effect can be achieved.

Although the present invention has been explained in relation to its preferred embodiment, it is to be understood that many other possible modifications and variations can be made without departing from the spirit and scope of the invention as hereinafter claimed.

What is claimed is:

1. An automatic white-balance correction method for digital camera, which divides a captured picture into multiple sampled regions for performing a white-balance correction, the method comprising the steps of:
   (A) transforming image data of the captured picture form RGB format to YCrCb format;
   (B) calculating mean values of Y, Cr, and Cb for each sampled region based on the multiple sampled regions; and
   (C) using Cr and Cb as two coordinate axes to define four quadrants, and using the values of Cr and Cb of each sampled region to determine a corresponding quadrant for each sampled region, thereby determining a correction direction based on the number of sampled regions in each quadrant.

2. The automatic white-balance correction method for digital camera as claimed in claim 1, wherein in step (C), if the sampled regions are substantially distributed in quadrants II and IV, a ratio of Cr and Cb is adjusted to be 1:1 for correction.

3. The automatic white-balance correction method for digital camera as claimed in claim 2, wherein when the sampled regions are substantially distributed in quadrant II, a red gain is decreased and a blue gain is increased for correction.

4. The automatic white-balance correction method for digital camera as claimed in claim 2, wherein when the sampled regions are substantially distributed in quadrant IV, a red gain is increased and a blue gain is decreased for correction.

5. The automatic white-balance correction method for digital camera as claimed in claim 1, wherein when the sampled regions are substantially distributed in quadrant III, red and blue gains are increased simultaneously for correction.

6. The automatic white-balance correction method for digital camera as claimed in claim 1, wherein when the sampled regions are substantially distributed in quadrant I, red and blue gains are decreased simultaneously for correction.

7. The automatic white-balance correction method for digital camera as claimed in claim 1, further comprising a step (B') between steps (B) and (C) for filtering out regions which are too bright or too dark based on the value of Y of each sampled region.

8. The automatic white-balance correction method for digital camera as claimed in claim 7, wherein in step (B'), the sampled region is filtered out if its Y value is outside a range of 64~180.

9. The automatic white-balance correction method for digital camera as claimed in claim 1, wherein the captured picture is divided into an upper region, a middle region, and a lower region.

10. The automatic white-balance correction method for digital camera as claimed in claim 9, wherein the upper region is further divided into left and right regions.

11. The automatic white-balance correction method for digital camera as claimed in claim 9, wherein the lower region is further divided into left and right regions.

12. The automatic white-balance correction method for digital camera as claimed in claim 9, wherein the middle region is further divided into left, right and center regions, and a subject region in the center region.

* * * * *